(No Model.)

C. W. EMERSON
CHURN.

No. 246,379. Patented Aug. 30, 1881.

Witnesses.
Wm H. H. Emmons
R. F. Lord.

Inventor
Chs. W. Emerson
by J. H. Adams
Atty

UNITED STATES PATENT OFFICE.

CHARLES W. EMERSON, OF SOMERVILLE, MASSACHUSETTS.

CHURN.

SPECIFICATION forming part of Letters Patent No. 246,379, dated August 30, 1881.

Application filed September 23, 1880. (No model.)

*To all whom it may concern:*

Be it known that I, CHARLES W. EMERSON, of Somerville, in the county of Middlesex and State of Massachusetts, have invented a new and useful Improvement in Churns, of which the following is a specification.

The object of my invention is to produce a churn in the operation of which the globules of which the cream is composed are acted upon by air, or are aerated, so as to prevent in a great measure their being broken up in the process of churning.

Recent microscopical examination reveals the fact that the globules composing the mass of cream to be made into butter are enveloped in a thin pellicle, which must be removed from the globules before they can be thoroughly united to form the butter. In the ordinary process of churning it is considered necessary to use considerable force to break up the globules by dashing the cream against obstructions in the churn or moving the same violently by various means, the result of which is to impart a greasy appearance to the butter.

In my improved process a large proportion of the globules remain whole and unbroken, while the pellicle is entirely removed from the globules, resulting in a very superior quality of butter, both as to taste and appearance.

The invention consists of a lozenge-shaped churn provided with perforated partitions and triangular compartments, and suspended from above by cords crossing each other, whereby the churn, as it is oscillated, will assume a perpendicular position in the direction of its length, so that as the cream falls downward from the upper end through the perforated partition air from the lower end will be caused to rise and pass through the falling cream, thus completely aerating the same.

Figure 1:
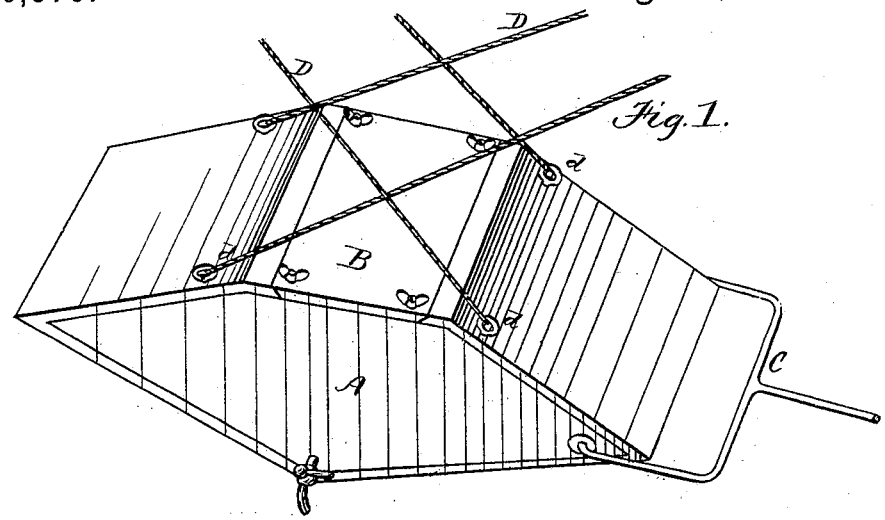
Figures 2, 3:
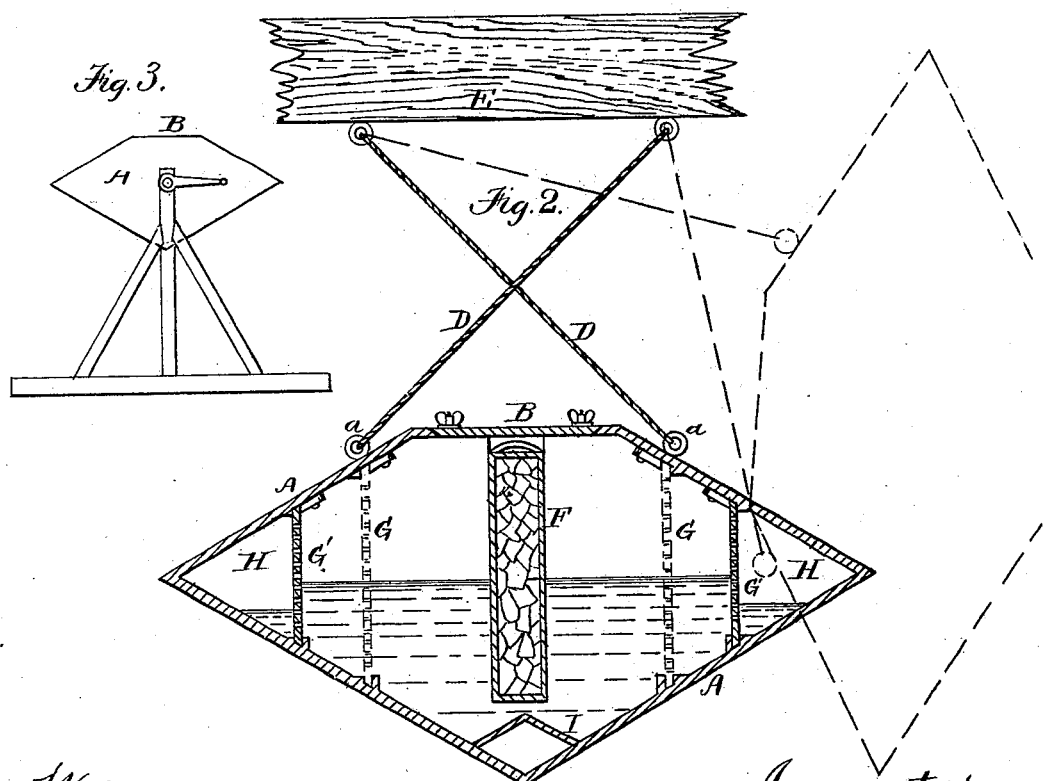

Referring to the drawings, Figure 1 is a perspective view of a churn embodying my improvements. Fig. 2 is a horizontal vertical section, and showing the method of suspending the churn. Fig. 3 shows a churn hung on pintles in a frame, so as to be turned by a crank.

A represents the body of the churn, the longer sides of which are of lozenge shape, as shown, with the exception of the upper side, which is made flat, so as to admit of a cover, B, being fitted in the same. In the cover B is set a glass plate, (not shown,) so as to allow the contents to be seen.

C is a handle pivoted to the sides of the churn at one end, by means of which the churn is oscillated. The churn is hung to a beam or other support, E, by means of chains or cords D D, which are so arranged as to cross each other, as shown in Fig. 2, the effect of which is that when the churn is swung to one side it will assume a perpendicular position without slackening either cord, as shown by the dotted lines in Fig. 2.

In the center of the churn A is a casing or tank, F, extending transversely across the churn and fitted in guides, so as to be readily inserted and removed. This tank is designed for holding ice or water of any desired temperature, and is made preferably of metal.

G G represent partitions extending transversely across the churn inside, near each end, and provided with small perforations. G' G' are similar partitions, having larger perforations than those of partitions G, and placed nearer the ends of the churn, as shown. The said partitions are made removable, and either or both sets G G G' G' may be used, as required.

H H are chambers or compartments at each end of the churn.

Instead of being suspended by chains or cords, as shown in Fig. 2, the churn may be hung on pintles in a frame and rotated by means of a crank, as shown in Fig. 3; or the churn may be set with its lower angular portion resting upon a table or other flat surface, and the ends moved up and down to oscillate the churn.

The tank F may be used or not, as circumstances require, and instead of ice, water of any required temperature may be used.

In the operation of churning, the spaces H H, when either is at the lower end of the churn, become air-chambers when the churn is in a vertical position, so that the air in the lower chamber passes up in the form of bubbles through the streams of cream falling from the perforated partition, thus completely aerating the globules, and effecting the removal of the pellicles from the same and leaving them whole and unbroken. When the globules become separated from the cream the buttermilk is drawn off at the bottom of the churn and the partitions G' removed. Salted water or brine is then put into the churn, when the latter is again oscillated, thus removing all remains of buttermilk and compacting the butter into a solid mass.

The apparatus may be used as a milk-cooler, the perforated partitions serving to distribute the milk in small streams upon the cooling-tank F.

I represents a removable angular abutment, composed of a solid block; or it may be of sheet metal or wooden slats extending transversely across the bottom of the churn, and of a corresponding shape, or nearly so, reversely with the angular portion of the bottom of the churn, so that as the churn is turned the cream will fall upon one side of the abutment I and be thrown off toward the opposite side of the churn, the portion below the under side of the abutment constituting an air-space, into which the cream falls, and thus causing the air to be forced through the cream.

I do not claim perforated partitions in a churn; nor do I claim suspending a churn by ropes from above; but

What I claim as my invention is—

The lozenge-shaped churn A, provided with the perforated partitions G' G' and the triangular compartments H H, and suspended from above by cords D D, crossing each other, whereby the churn as it is oscillated will be caused to assume a perpendicular position in the direction of its length, as and for the purpose specified.

In testimony whereof I have signed my name to this specification in the presence of two subscribing witnesses.

CHARLES W. EMERSON.

Witnesses:
 JOS. H. ADAMS,
 EDW. S. COBB.